United States Patent [19]

Siebert

[11] 3,772,961

[45] Nov. 20, 1973

[54] HYDROSTATIC ROTARY TABLE

[75] Inventor: William R. Siebert, Fond Du Lac, Wis.

[73] Assignee: Giddings & Lewis, Inc., Fond du Lac, Wis.

[22] Filed: Apr. 6, 1972

[21] Appl. No.: 241,724

[52] U.S. Cl................ 90/58 B, 90/58 R, 51/240 T, 74/813 R, 308/9
[51] Int. Cl............................................. B23d 7/08
[58] Field of Search .................... 90/58 B, 58 R, 56; 408/71, 90; 308/9, 5 R; 74/813 R; 51/240 T

[56] References Cited
FOREIGN PATENTS OR APPLICATIONS
1,047,342  11/1966  Great Britain.......................... 90/58

Primary Examiner—Gil Weidenfeld
Attorney—Wolfe, Hubbard, Leydig, Voit & Osann

[57] ABSTRACT

An improved work carrying table for machine tools including pivotal and outer hydrostatic bearings for slidably supporting the table platen on its base and for providing precise indexing and rotation of the platen. The outer hydrostatic bearings each comprise a gib structure with a bearing surface situated between a way mounted on the platen and preload actuators recessed in one of the oppositely extending arms of a fixed preload member mounted on the base. Each preload actuator comprises a flexible bladder containing a rigid core plate, preloading being accomplished by pressurized hydraulic fluid pumped into the pressure chamber formed between the bladder and one surface of the core plate. The work carrying table also includes a plurality of manifolds mounted on the preload member and the base to efficiently direct the pressurized hydraulic fluid to the hydrostatic bearings and the actuators and a backlash-free, preloaded gear drive means to insure precision indexing of the platen.

5 Claims, 9 Drawing Figures

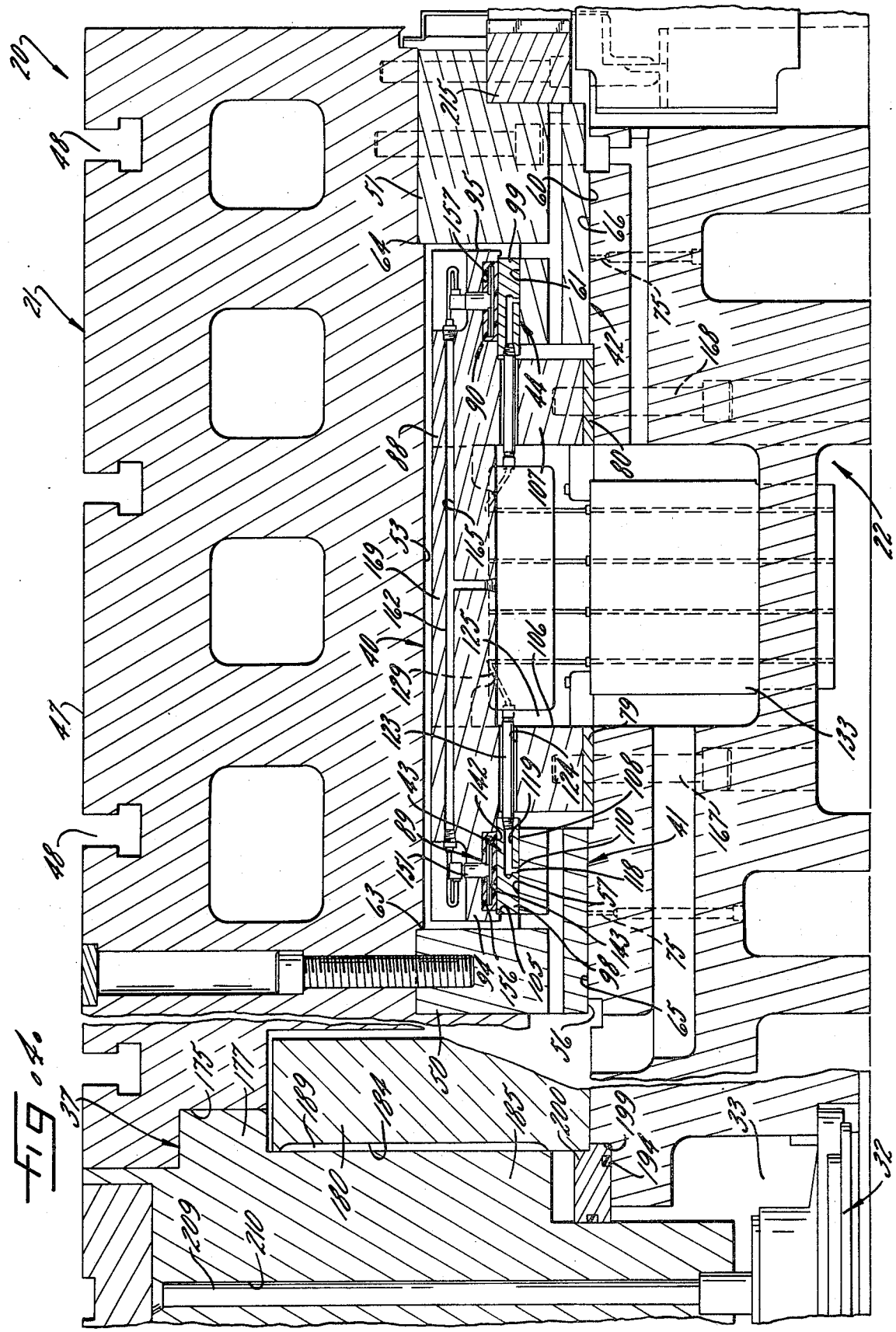

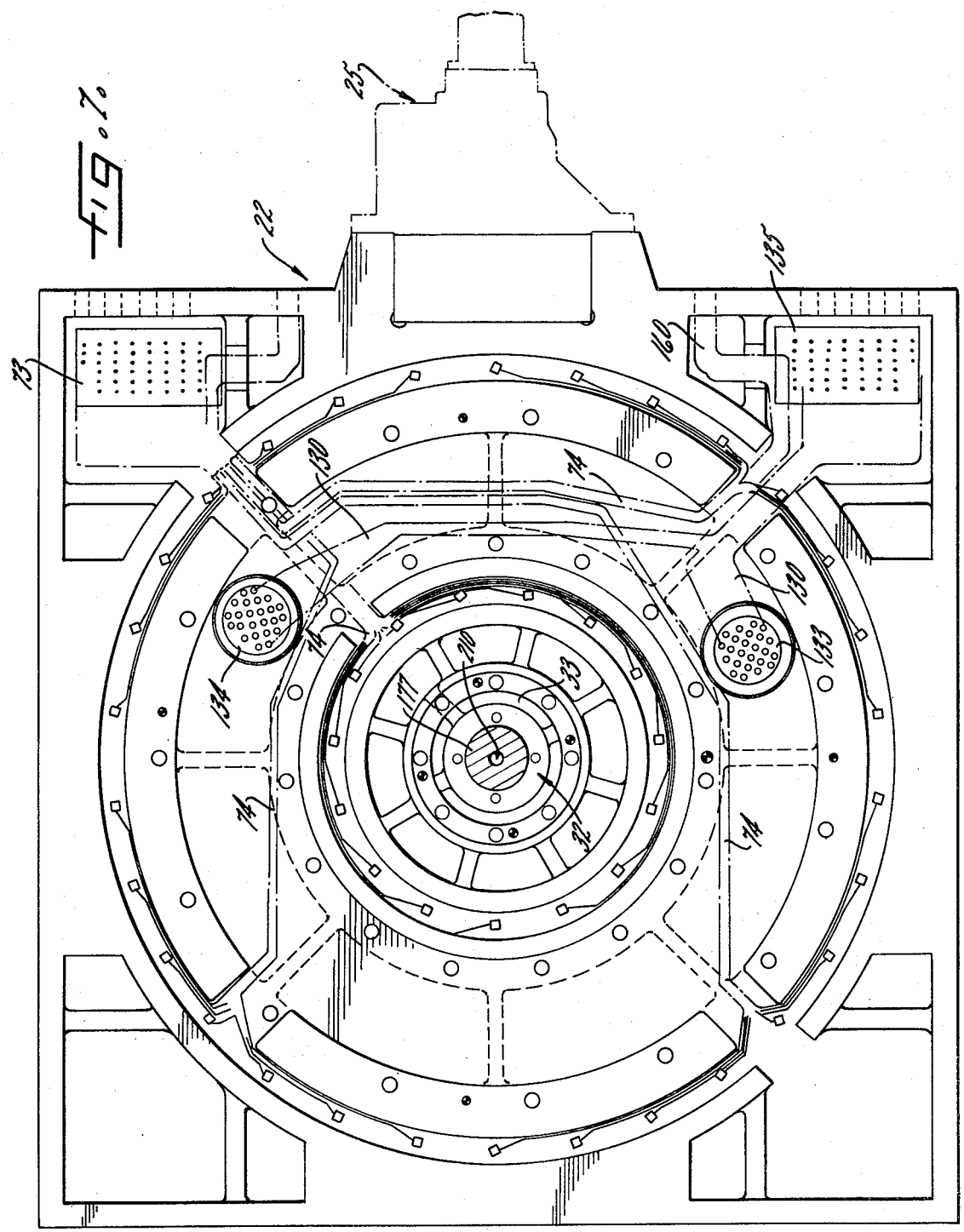

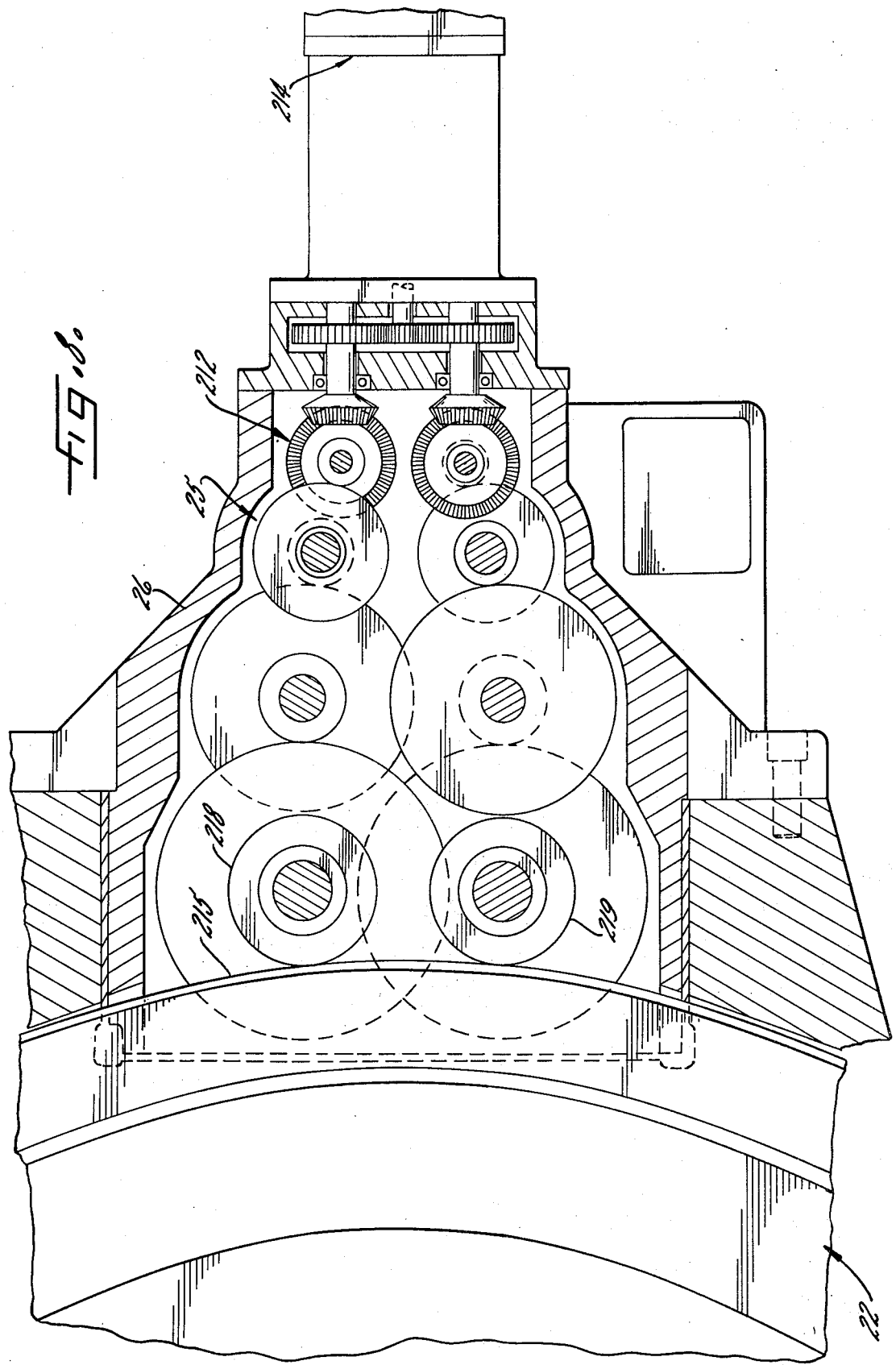

HYDROSTATIC ROTARY TABLE

DESCRIPTION OF THE INVENTION

This invention relates generally to work carrying tables for machine tools and, more specifically, to improved work carrying tables having preloaded hydrostatic bearings. resutting Work carrying tables with preloaded hydrostatic bearings have been advantageously used for many years. Hydrostatic bearings reduce wear and thus preserve the precision of the bearings without the need for manually adjustable gibs. By the application of a biasing force to the hydrostatic bearings, distortion of the bearing structures and the table platen under heavy loads is significantly reduced and the indexing accuracy of the table is increased by the resulting stiffness of the bearing.

However, in certain prior work carrying tables, particularly those which carry heavy workpieces, the large preload biasing forces applied to the hydrostatic bearings often create force couples within the bearing structure which can cause their own distortion of the platen surface. It has also been difficult in certain prior tables to maintain the preload forces uniform along the length of the bearing structures with the result that the benefits of preloaded hydrostatic bearings are reduced and there is resultant distortion of the platne surface by heavy workpieces.

One object of the present invention is to provide a work carrying table having preloaded hydrostatic bearings for accurate indexing of the table and in which the preloading forces do not distort the surface of the table platen. A related object is to provide such a table which is also adapted for precision contour machining of workpieces supported on the rotating table platen.

A further important object of the invention is to provide a work carrying table having preloaded hydrostatic bearings in which the preload forces are uniform along the bearing structure. A related object of the invention is to provide a preloaded hydrostatic bearing structure for work carrying tables having a plurality of hydraulically operated bladder assemblies, each of which applies a uniform preload force to an underlying gib section of the bearing structure.

Other objects and advantages of the invention will become apparent as the following description proceeds, taken together with the accompanying drawings, wherein:

FIG. 3 is an enlarged, broken vertical sectional view illustrating a supporting and a preload hydrostatic bearing incorporated in the rotary table of FIG. 1;

FIG. 4 is an enlarged, broken vertical sectional view illustrating the preload assembly incorporated in the rotary work table of FIG. 1;

FIG. 7 is a horizontal plan view taken in the plane of the line 7—7 in FIG. 1 illustrating the bottom of the table base;

FIG. 8 is a broken horizontal sectional view taken in the plane of the line 8—8 in FIG. 1 illustrating the gear drive of the table;

Figure 1:
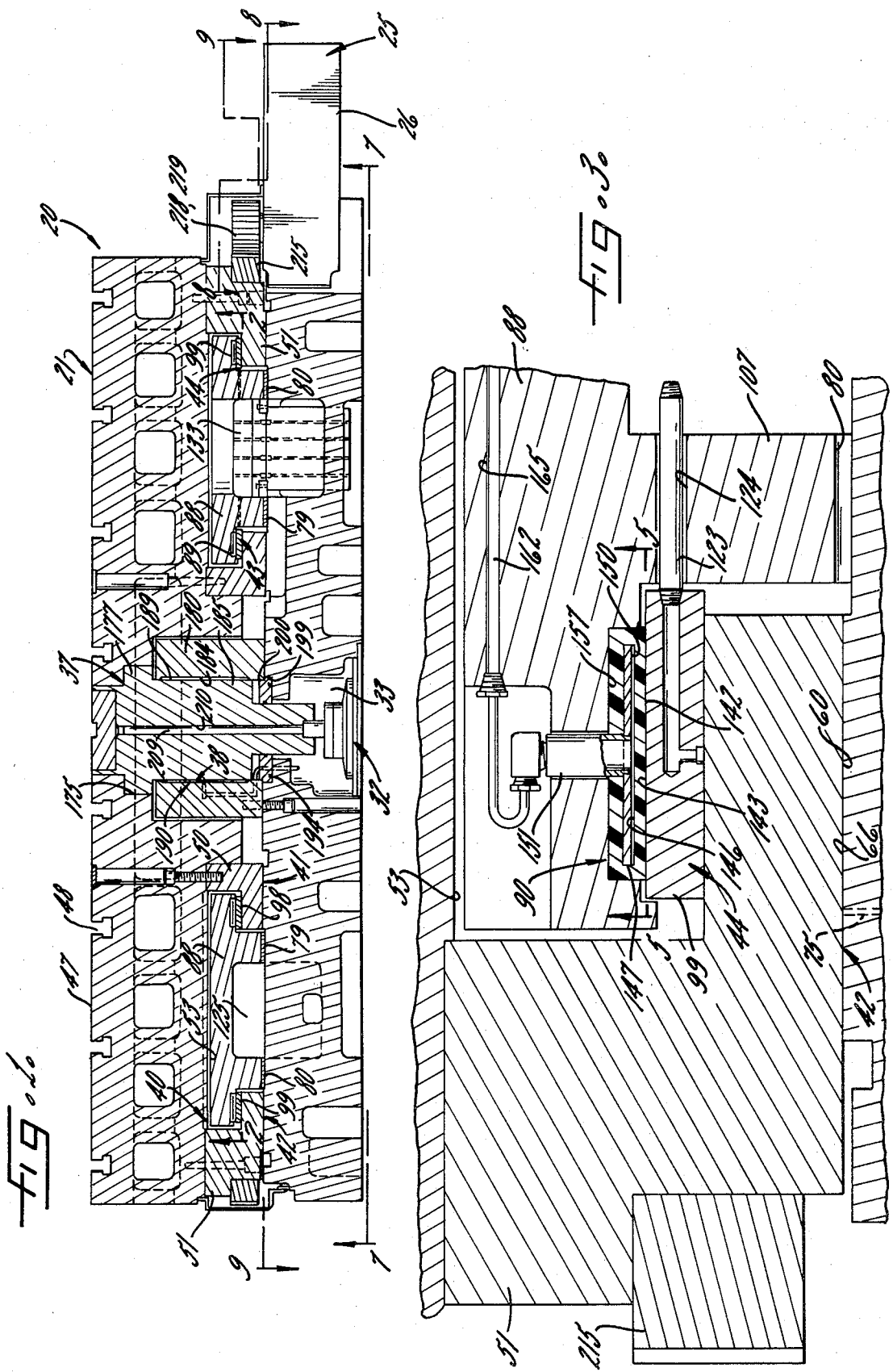
FIG. 1 is a vertical sectional view taken transversely through an illustrative rotary work table embodying the present invention.

While the invention is susceptible of various modifications and alternative constructions, certain illustrative embodiments have been shown in the drawing and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

Referring more particularly to FIG. 1, the invention is there exemplified in a rotary work table 20 which may be used to support and rotate a workpiece relative to the tool spindle of a machine tool such as a horizontal boring, drilling and milling machine (not shown). The rotary table comprises a work table or platen 21 pivotally supported upon a base member 22 which, in turn, may be mounted on or adjacent the machine tool in any suitable manner. For indexing the platen 21 to a chosen position or rotating it to perform a contour machinigng operation on a workpiece mounted thereon, the work table is provided with a preloaded table drive 25 mounted within a gear box 26 projecting radially of the base 22. For detecting the position of the platen 21, there is included a rotary transducer 32 mounted in a recess 33 in the base of the table. The transducer 32 may be of a well known type such, for example, as one known in the trade as an "Inductosyn" unit. A hub assembly 37, including hydrostatic bearing 38, centers the platen on the base for sliding rotation of supporting outer hydrostatic bearings 41, 42. The outer bearings 41, 42 are proloaded by a preload hydrostatic bearing assemby 40 comprising preload hydrostatic bearings 43, 44 which coact respectively with the bearings 41, 42.

The platen has a flat finished upper surface 47 formed with a plurality of spaced apart inverted T-slots 48. Clamps engaging the slots 48 are applied to a workpiece in a well known manner for holding the same on the upper surface 47 of the platen for machining with the platen either locked in an indexed position or free to rotate the workpiece relative to the tool spindle. Two annular ways 50, 51 are mounted on the bottom surface 53 of the platen. Referring to FIG. 4, the inner way 50, which in this case happens to be a generally L-shaped cross section, has been machined and scraped to present a relatively broad supported bearing surface 56 and a narrower preload bearing surface 57; likewise, the outer way 51 which in this case happens to be a generally Z-shaped cross section, has been machined and scraped to present a relatively broad supported bearing surface 60 and a narrower preload bearing surface 61. In the present instance, the annular ways are each of unitary construction and are piloted concentrically with respect to the hub assembly 37 by shoulders 63, 64 formed on the bottom surface 53 of the platen.

Figure 9:
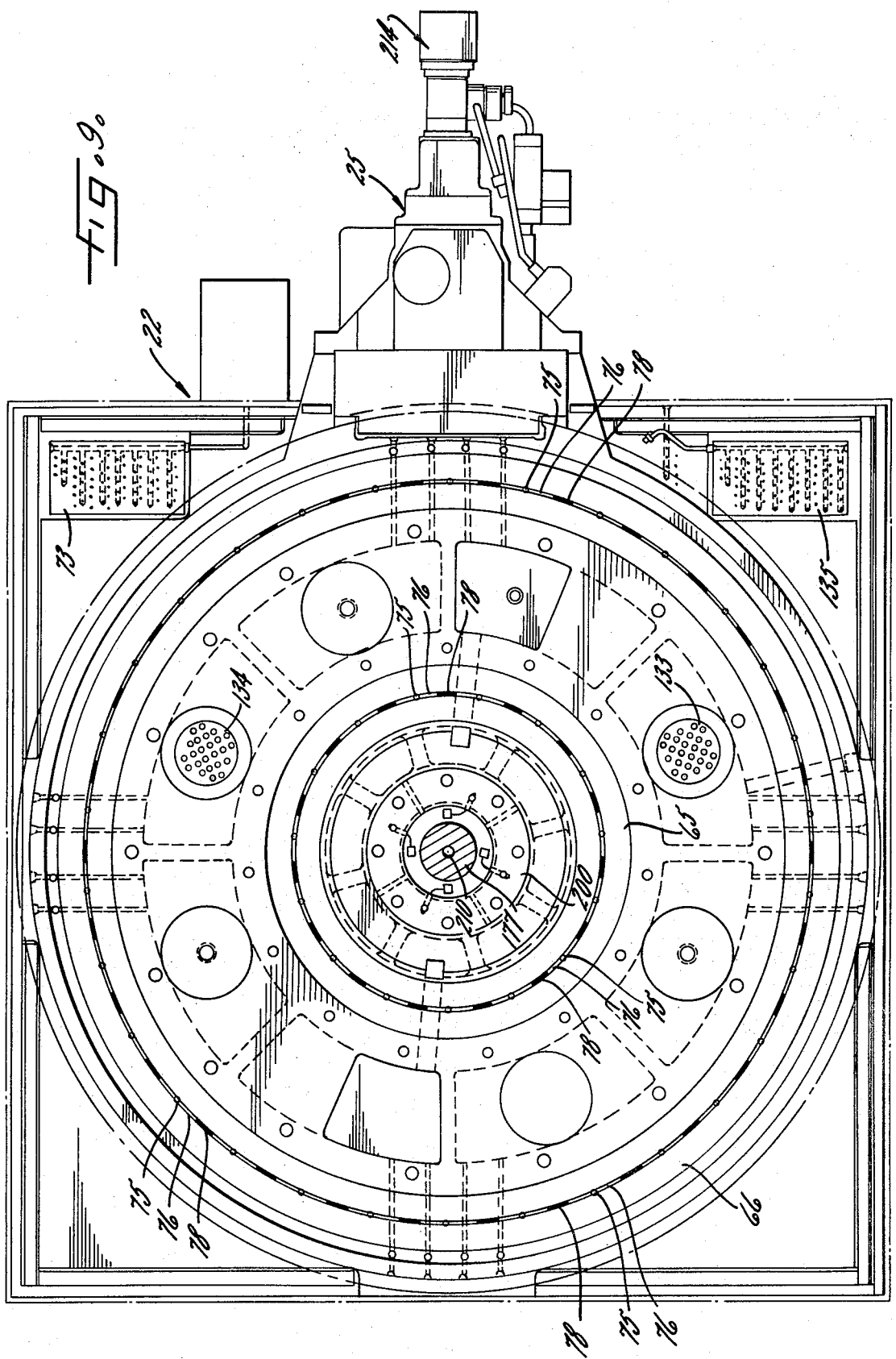
FIG. 9 is a broken horizontal sectional view taken in the plane of the line 9—9 in FIG. 1 illustrating the top of the table base.

The base 22 is formed by two annular supporting bearing surfaces 65, 66 in direct facial alignment with the supporting bearing surfaces 56, 61 respectively of the annular ways 50, 51 to form the supporting hydrostatic bearings 41, 42 wherein each supported bearing surface is slidably engaged by its respective supporting bearing surface through a film of pressurized oil (FIGS. 1 and 4). To complete the hudrostatic bearings 41, 42, pressurized oil at approximately 300 psi. is supplied from 1,000 psi. source via capillary restrictors (not detailed) mounted on manifold 73 and via conduits 74 to a series of spaced ports 75 along each supporting bearing surface 65, 66 of the base and distributed by means of pads or grooves 76 extending from each port 75 (FIGS. 7 and 9). Between the grooves spaced circularly about the annular supporting bearing surfaces 65, 66 is an epoxy resin dam 78 which is flush with the bearing surface. The ports 75 and grooves 76 are of small diameter relative to the width of their associated bearing surfaces 65, 66; because of this and the restrictors, the flow of oil to the supporting bearing surfaces is regulated to insure the desired hydrostatic bearing function. The maximum pressure at the ports and grooves decreases more or less linearly from the ports and grooves to the edges of the bearing surfaces where relief passages, such as the series of radial drain channels 79, 80 (FIG. 1) are provided to carry off exhaust oil to a sump in the base 22 (not shown).

Provision is made in the preload hydrostatic bearing assembly 40 for preloading the hydrostatic bearings to achieve accurate indexing and rotation of the platen 21 without distortion of the platen surface 47 (FIGS. 1, 3 and 4). This is accomplished by means of a preload member 88, which in the present instance is an annular ring or way of generally T-shaped cross section, secured to the table base concentrically with respect to the hub assembly 37, a pair of preload actuating means 89, 90 recessed respectively within one of the laterally extending arms 94, 95 of the preload member of annular way 88, and a piar of preload gibs 98, 99 situated respectively between the preload bearing surface 57 of the L-shaped inner way 50 and the actuating means 89 and between the preload bearing surface 61 of the Z-shaped outer way 51 and the actuating means 90.

Taking, as an example, the elements associated with the inner way 50, it will be noted that the preload gib 98 is fashioned of a plurality of arcuate gib sections 100 (FIG. 2) situated end to end to form an annular ring. Each gib section 100 is a flat bar laterally confined between a shoulder 105 of the arm 94 and a leg 106 of the annular ring 88. The clearance dimensions are such that the gib 98 is permitted to float vertically and laterally a slight amount. The lower face 108 of each gib section has been machine ground flat to act as a hydrostatic bearing surface and has appropriate ports 110 and grooves or pads 111 for distributing pressuirized oil at approximately 380 psi. as previously described. Each gib section has a number of inter-connected vertical and lateral bores 118, 119 connecting each port 110 to a nipple 123 that extends through a bore 124 in the leg 106 into the annular cavity 125. Each nipple is connected to one of the conduits 129 which in turn is connected to a corresponding one of the conduits 130 by one of the cylindrical manifolds 133, 134 with the conduit 130 leading via a corresponding capillary restrictor (not detailed) in the capillary manifold 135 to the pressurized oil source.

A plurality of arcuate gib sections 100 (FIG. 2) are also operatively interconnected to form the preload gib 99 and connected to a pressurized oil source of approximately 1,000 psi. thru a capillary restrictor in the same manner as the gib sections of preload gib 98 to operate with the preload bearing surface 61 of the outer way 51 as the preload hydrostatic bearing 44.

Figure 5:
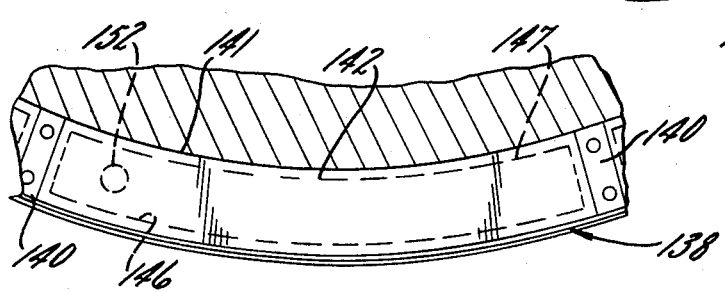
FIG. 5 is an enlarged broken horizontal sectional view of a preload actuator taken in the plane of the line 5—5 in FIG. 4.

The preload actuating means 89 (FIGS. 2, 4 and 5) which is operatively associated with the inner way 50 and the preload gib 98 to preload the hydrostatic bearing 41 is formed of a plurality of identical actuators 138 separated end to end by a plurality of cross-blocks 140 to form an annular ring. The repload actuating means 90 associated with outer way 51 and preload gib 99 is comprised of similar actuators and cross-blocks (FIGS. 2, 4 and 5). but in this case the actuators are formed with areas of slightly greater radius than those associated with the inner way 50.

Each actuator 138 (FIGS. 2, 3, 5, 6) in this instance, comprises an arcuate bladder 141 molded of a flexible, oil resistant material such as a high density urethane plastic and having a flat bottom surface 142 adapted to abut against top surface 143 of an associated gib section 100. Internally, the actuator 138 is formed with a relatively flat arcuate cavity 146 extending substantially the length and breadth of the actuator except for a peripheral wall. Molded within the cavity 146 is a rigid core plate 147 sealed on its top surface and its edges to the top and sides of the cavity, but free of the cavity on its bottom surface such that a thin pressure chamber 150 (slightly exaggerated in FIG. 3) exists between the bottom of the cavity 146 and the bottom of the core plate 147. Pressurized oil of approximately 200 psi. is delivered to the pressure chamber 150 through a conduit 151 that passes through the top of the bladder and is anchored by a leakproof connection in a port 152 in the core plate 147 so as to open into the pressure chamber.

Figure 2:
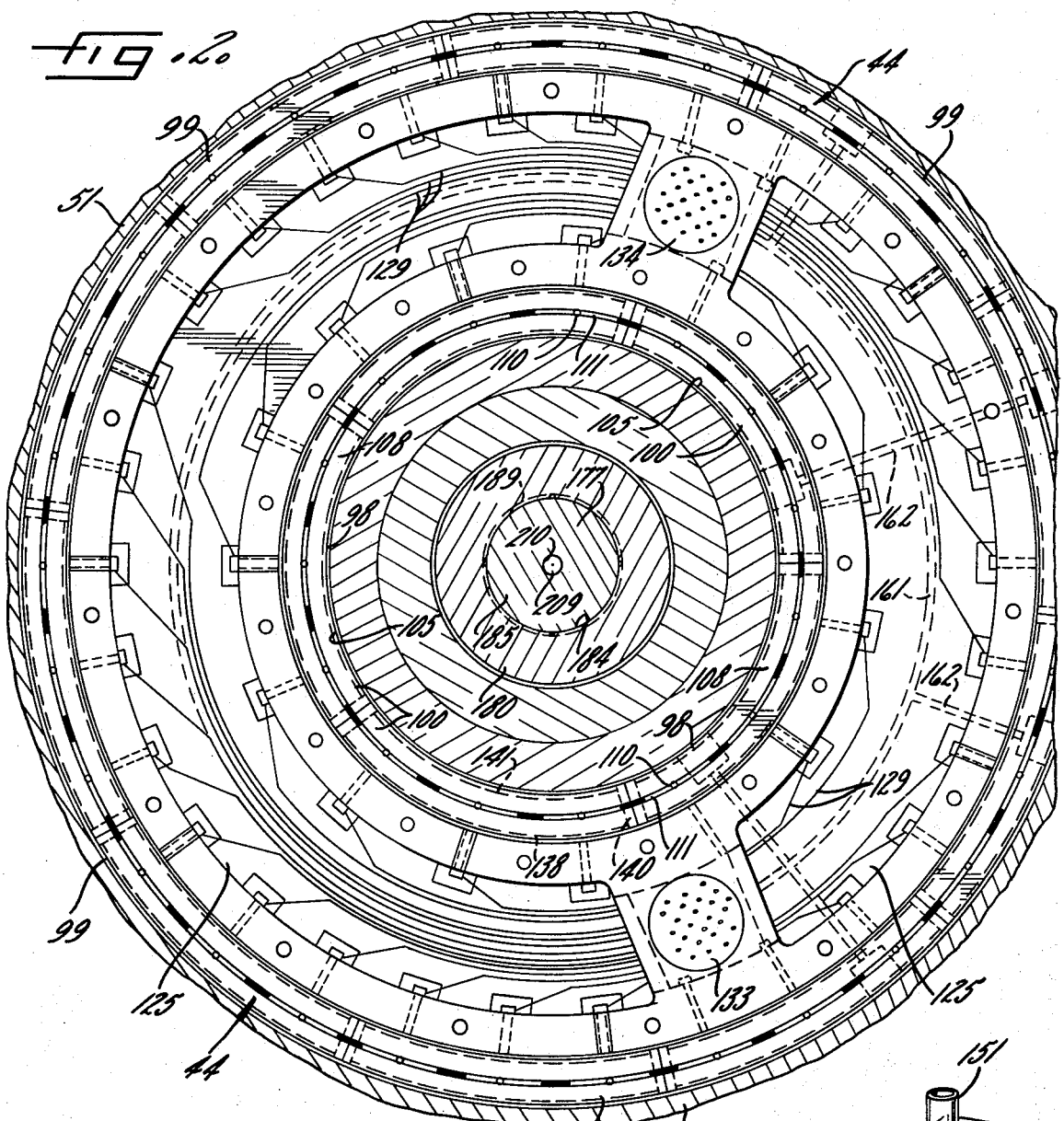
FIG. 2 is a horizontal sectional view taken in the plane of the line 2—2 in FIG. 1.
Figure 6:
FIG. 6 is an enlarged, horizontal plan view of the preload actuator of FIG. 5.

The preload actuating means 89, 90 are respectively mounted within recesses 156, 157 in arms 94, 95 with substantially equal spacing between the core plates 147 and the boundaries of the recesses and are in contact with the top surfaces of the preload gibs 98, 99 with the ends of each gib section 100 preferably underlying a cross-block 140 (FIGS. 2–4). The pressurized oil is provided to the preloading actuating means from a pressure source through a port in the base (not shown). Connecting this port to each of the actuator bladders 141 is a conduit 160 that is connected through the cylindrical manifold 133 to a supply conduit 161. The supply conduit extends through the cavity 125 and has branch conduits 162 that interconnect it through bores 165 in the annular ring 88 with the conduits 151 of the individual actuators 138 (FIGS. 2–4 and 7). Because of the relative orientations of the gibs 98, 99 12 and their respective actuating means 89, 90 and the uniform pressure provided to all the actuators 138 of the actuating means from a single pressure source, the actuating means will exert a constant, uniform preload force between the core plates and the gibs. The latter are free to float slightly, so that the preload forces on the preload hydrostatic bearings 43, 44 are uniform and the clearances in the bearings are substantially uniform even when the table is deflected under large unbalanced loads. preload the ring Another important advantage of this construction is that the preload forces exerted on the hydrostatic bearings 41, 43 and 42, 44 are not applied to the platen to distort its upper surface 47 (FIG. 4). The inner preload actuating means 89 exerts a compression force on the inner arm 94 and screws 167 or other means mounting the T-ring to the base exert a tension force on the leg 106. The combination of these forces results in a clockwise force couple being applied to the body 169 of the preload way or T-ring 88. On the other hand, the outer preload actuating means 90 exerts a compression force on the arm 95 and screws 168 or other means mounting the T-ring 88 to the base exert a tension force on the leg 107. The combination of these forces results in a counterclockwise force couple being applied to the body 169 of the T-ring 88. These two force couples, because they are in opposite directions, tend to cancel out. Furthermore, whatever slight distortion there is in the T-ring 88 is not transmitted to the platen because of the clearance provided between the ring and the platen that allows the ring to distort a slight amount without contacting the platen.

In an alternative construction of actuator 138, the bladder 141 may be formed with an arcuate cavity, such as cavity 146, through its center which acts as a pressure chamber in the manner of pressure chamber 150. The conduit 151 may then be anchored directly to the bladder, with the core plate 147 omitted. As a result, the preload force is exerted between the tops of the recesses 156, 157 and the gibs.

As noted earlier herein, the platen 21 is centered on the base 22 and held against radial motion by the hub assembly 37 (FIGS. 1 and 2). There is formed in the center of the platen a step bore 175 within which is fixedly secured a pivot post 177. An upstanding cylindrical hub 180 is fixedly attached to the base by a suitable means. The hub 180 has an inner bore 184, to receive a mating cylindrical portion 185 of the pivot post 177 and is formed with a series of hydrostatic pads 189 to provide hydrostatic bearing 38 between the cylindrical hub and pivot post which is machined to provide a hydrostatic bearing surface to allow frictionless rotation between the pivot post and the inner bore. Pressurized oil at approximately 500 psi. is supplied to each pad 189 by a conduit via a capillary restrictor (not detailed) in the capillary manifold 135 and is distributed through the hydrostatic bearing 38 as previously described. A sealing and pilot ring 194 is secured within a counterbore 199 of the base and held in place by an overlapping bottom edge 200 of the hub 180. Mounted in the bottom of the base and connected to the platen by a rod 209 fitted in a bore 210 in the hub is a transducer 32 for measurin the index position of the platen relative to the base.

The table drive 25 (FIG. 7) is a backlash-free, preloaded highly responsive drive similar to the invention of U.S. Pat. No. 2,946,232 to Gordon H. Jones and assigned to the assignee of the present application. The preloaded table drive comprises a pair of parallel reduction gear trains 212, 213 connecting the single drive motor 214 to the table ring gear 215 with each gear train preloaded to a predetermined amount of its maximum load. The output opinions 218, 219 of the parallel gear trains contact and drive the ring gear 215 in tandem. An advantageous feature of the table drive is the axial staggering of corresponding gears of the two gear trains so that the gear trains overlap to provide a very compact unit easily accommodated on the yoke 26 in a relatively small area.

Although the present invention is exemplified in a rotary table, it also finds utility in a work carrying table having a platen adapted for linear motion in a horizontal or vertical plane. This would involve certain changes in the shape of the bearing components to accommodate the desired platen motion.

What is claimed is:
1. In a workpiece carrying table assembly for a machine tool, the combination comprising
   a. a base having two laterally-spaced supporting bearing faces;
   b. a way fixed to said base and having two oppositely extending arms;
   c. a platen slidably carried on said base and having two laterally-spaced supported hydrostatic bearing faces and two laterally-spaced preload hydrostatic bearing faces, each supported bearing face being disposed in sliding engagement with a respective one of said supporting bearing faces and each preload bearing face being disposed below a respective one of said arms;
   d. power means for slidably moving said platen over said base;
   e. a plurality of actuators recessed in each of said arms and linearly-spaced opposite a respective preload bearing face;
   f. a plurality of preload gibs, each preload gib having a hydrostatic bearing face and being interposed between an associated hydraulic actuator and said actuator's respective preload bearing face with said gib's bearing face in sliding engagement with the respective preload bearing face;
   f. each of said hydraulic actuators including
      a flexible bladder means and
      a thin core plate carried within said bladder means so as to define a pressure chamber between one surface of said plate and said bladder means; and
   h. means for supplying a uniform hydraulic pressure to said pressure chambers to cause said actuators to apply a uniform preload force to said gibs to preload the hydrostatic way bearings to maintain said base and said platen relatively slidable with a minimum of friction to provide precise indexing of said platen relative to said base.

2. The combination as in claim 1 wherein said power means includes a pair of parallel reduction gear trains, each geawr train being a backlash-free preloaded gear train.

3. In a rotary table assembly for a machine tool, the combination comprising
   a. a pplaten for rotatably carrying work pieces
   b. a base for slidably carrying said platen, said base having two radially spaced annular supporting bearing surfaces;
   c. power means for rotating said platen relative to said base;
   d. a cylindrical hub fixedly attached to said base and having an inner bore formed with hydrostatic pads which establish a radial hydrostatic bearing surface;
   e. an annular preload way fixed to said base and having two radially, oppositely extending arms;
   f. said platen having a pivot post with a hydrostatic bearing surface disposed within said cylindrical hub in sliding engagement with said radial bearing surface, said platen further having two radially spaced, annular supported hydrostatic bearing surfaces and two radially spaced, annular preload hydrostatic bearing surfaces, each annular supported bearing surface being disposed in sliding engage-ment with a respective one of said supporting bearing surfaces and each annular preload bearing surface being disposed below a respective one of said arms to said annular way;

g. two groups of hydrostatic actuators, each gruop comprising a plurality of actuators recessed in a respective one of aid arms and circularly spaced opposite a respective preload bearing surface;

h. two groups of preload gibs, each group comprising a plurality of preload gibs having hydrostatic bearing surfaces and each preload gib being interposed between a hydraulic actuator and its respective preload bearing surface with said gib's bearing surfaces in sliding engagement with the respective preload bearing surface;

i. each of said hydraulic actuator including
   a flexible bladder member having a cavity in its center;
   a thin core plate carried witnin said cavity to form a pressure chamber between said plate and said bladder; and j. means for providing a uniform hydraulic pressure to said pressure chambers to cause said actuators to apply a uniform preload force to said gibs to preload the hydrostatic way bearings to maintain said base and said platen relatively slidable with a minimum of friction to provide precise positioning and rotation of said platen relative to said base.

4. In a workpiece carrying table assembly for a machine tool, the combination comprising a. a base having two laterally-spaced supporting bearing faces;

b. a way fixed to said base and having two oppositely extending arms;

c. a platen slidably carried on said base and having two laterally-spaced supported hydrostatic bearing faces and two laterally-spaced preload hydrostatic bearing faces, each supported bearing face being disposed in sliding engagement with a respective one of said supporting bearing faces and each preload bearing face being disposed below a respective one of said arms;

d. power means for slidably moving said platen over said base;

e. flexible bladder means having a pressure chamber means and being recessed in each of said arms and linearly-spaced opposite a respective preload bearing face;

f. a plurality of preload gibs, each preload gib having a hydrostatic bearing face and being interposed between said bladder means and a preload bearing face with said gib's bearing face in sliding engagement with the preload bearing face; and g. means for supplying a uniform hydraulic pressure to said pressure chamber means for applying a uniform preload force to said gibs to preload the hydrostatic way bearings to maintain said base and asid platen relatively slidable with a minimum of friction.

5. In a rotary table assembly for a machine tool, the combination comprising a. a platen for rotatably carrying work pieces b. a base for slidably carrying said platen, said base having two radially spaced annular supporting bearing surfaces;

c. power means for rotating said platen relative to said base;

d. a cylindrical hub fixedly attached to said base and having an inner bore formed with hydrostatic pads which establish a radial hydrostatic bearing surface;

e. an annular way fixed to said base and having two radially, oppositely extending arms;

f. said platen having a pivot post with a hydrostatic bearing surface disposed within said cylindrical hub in sliding engagement with said radial bearing surface, said platen further having two radially spaced, annular supported hydrostatic bearing surfaces and two radially spaced, annular preload hydrostatic bearing surfaces each annular supported bearing surface being disposed in sliding engagement with a respective one of said supporting bearing surfaces and each annular preload bearing surface being disposed below a respective one of said arms of said annular way;

g. two groups of hydrostatic actuators, each group comprising a plurality of actuators recessed in a respective one of said arms and circularly spaced opposite a respective preload bearing surface, each actuator comprising a flexible bladder member with a pressure chamber;

h. two groups of preload gibs, each group comprising a plurality of preload gibs having hydrostatic bearing surfaces and each preload gib being interposed between a hydraulic actuator and its respective preload bearing surface with said gib's bearing surfaces in sliding engagement with said gib's bearing surfaces in sliding engagement with the respective preload bearing surface; and i. means for providing a uniform hydraulic pressure to said pressure chambers to apply a uniform preload force to said gibs to preload the hydrostatic way bearings to maintain said base and said platen relatively slidable with a minimum of friction to provide precise positioning and rotation of said platen relative to said base.

* * * * *